United States Patent [19]

Durbeck et al.

[11] Patent Number: 4,847,636

[45] Date of Patent: Jul. 11, 1989

[54] THERMAL DROP-ON-DEMAND INK JET PRINT HEAD

[75] Inventors: Robert C. Durbeck, San Jose; Jerome M. Eldridge, Los Gatos; Francis C. Lee, San Jose; Graham Olive, San Jose, all of Calif.

[73] Assignee: International Business Machines Corporation, Armonk, N.Y.

[21] Appl. No.: 287,578

[22] Filed: Dec. 15, 1988

Related U.S. Application Data

[63] Continuation of Ser. No. 114,272, Oct. 27, 1987, abandoned.

[51] Int. Cl.[4] .......... G01D 15/16

[52] U.S. Cl. .......... 346/140 R

[58] Field of Search .......... 346/140, 76 PH

[56] References Cited

U.S. PATENT DOCUMENTS

| | | | |
|---|---|---|---|
| 4,380,771 | 4/1983 | Takatori | 346/140 |
| 4,463,359 | 7/1984 | Ayata | 346/140 X |
| 4,490,728 | 12/1984 | Vaught | 346/140 X |
| 4,502,060 | 2/1985 | Rankin et al. | 346/140 |
| 4,535,343 | 8/1985 | Wright | 346/140 |
| 4,550,327 | 10/1985 | Miyakawa | 346/140 |

*Primary Examiner*—Joseph W. Hartary
*Attorney, Agent, or Firm*—Otto Schmid, Jr.

[57] ABSTRACT

A thermal drop-on-demand ink jet print head in which thermal cross-talk problems are eliminated by providing heat shield members in the space between each of the heater elements. The heat shield members comprise metal fingers attached to either the common heater electrode or one of the control electrodes. The heat shield members enhance flow of heat into the substrate to thereby minimize thermal cross-talk among adjacent channels.

20 Claims, 3 Drawing Sheets

FIG. 1
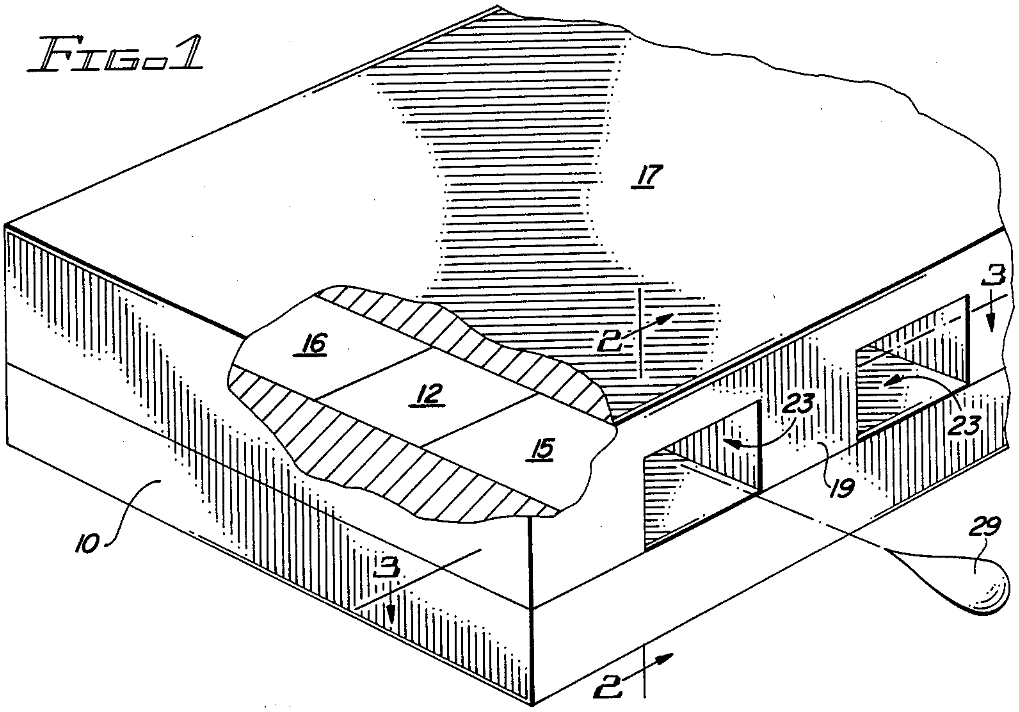
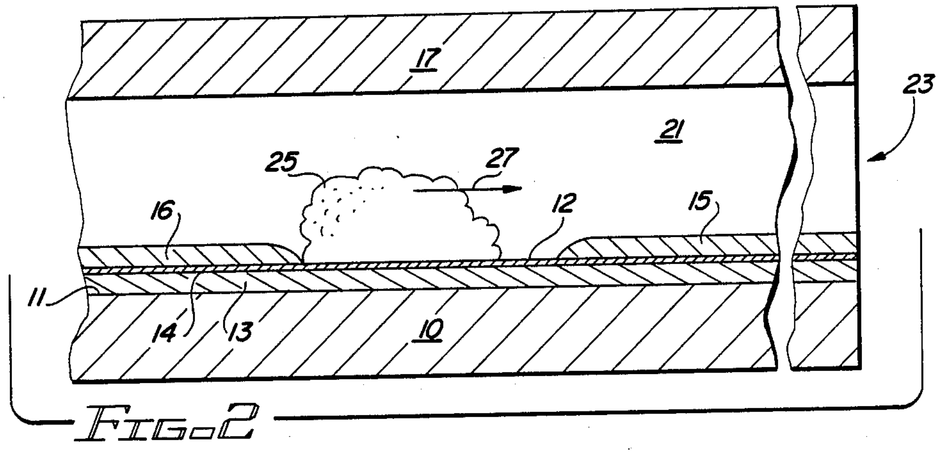
FIG. 2
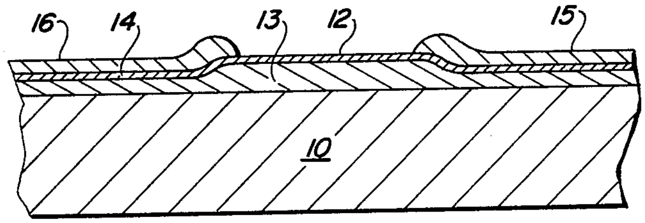
FIG. 9

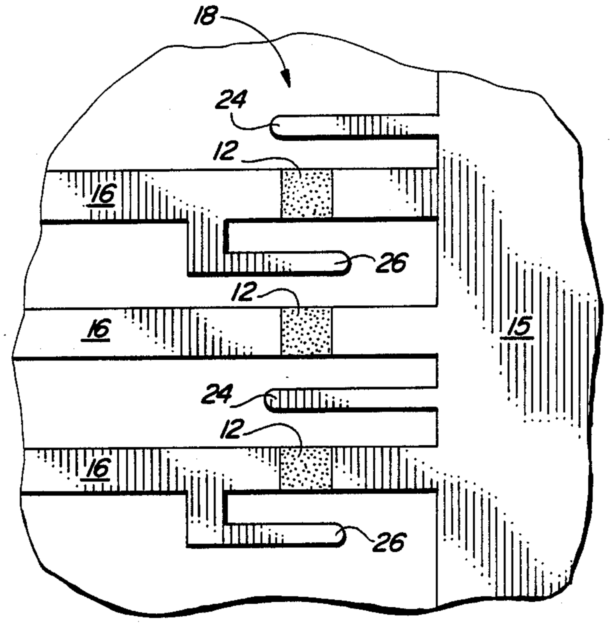
FIG. 6
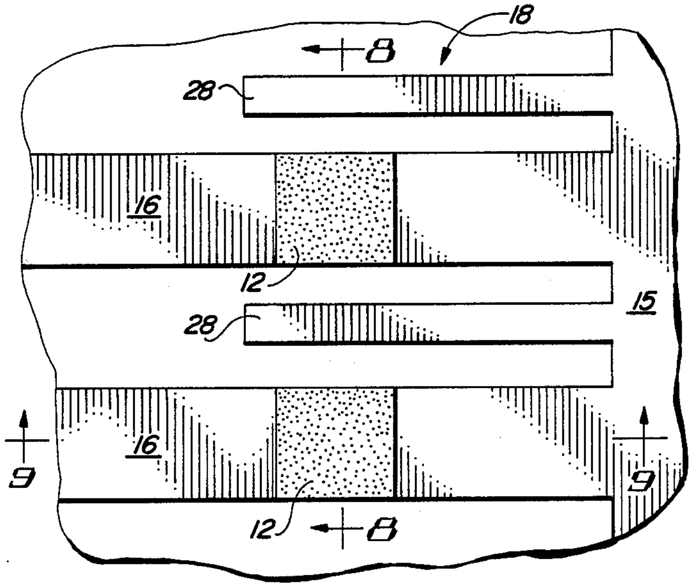
FIG. 7
FIG. 8
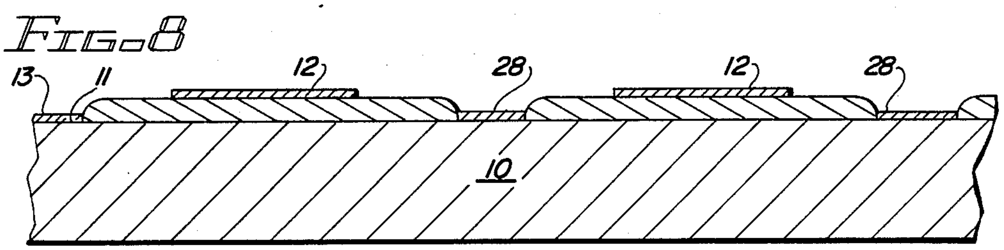

THERMAL DROP-ON-DEMAND INK JET PRINT HEAD

This is a continuation of application Ser. No. 114,272, filed Oct. 27, 1987 now abandoned.

BACKGROUND OF THE INVENTION

1. Field of the Invention

This invention relates to an ink jet printing system and more particularly to a thermal drop-on-demand ink jet printing system.

2. Description of the Prior Art

A thermal drop-on-demand ink jet printing system is known in which a heater is selectively energized to form a "bubble" in the adjacent ink. The rapid growth of the bubble causes an ink drop to be ejected from a nearby nozzle. Printing is accomplished by energizing the heater each time a drop is required at that nozzle position to produce the desired printed image.

Depending on the frequency of operation and the array density, adjacent channels in a print head may affect each other thermally although this has not been a substantial problem with thermal drop-on-demand ink jet printing systems that are currently marketed. However, in applications where the number of channels in a thermal ink jet head is increased for high resolution, color and page printing, there is a requirement for higher drop rates and increased print density and these requirements require a solution to the problems caused by the resulting thermal cross-talk. The thermal cross-talk impedes print head performance since it creates an unsteady, non-uniform temperature field which can significantly alter the mechanism of bubble nucleation thereby leading to poor print quality.

U.S. Pat. No. 4,502,060 to Rankin et al shows a thermal ink jet printer in which barrier walls substantially surround the heater elements to define the capillary channels for feeding ink between a source and an orifice plate. The barrier walls also serve to maintain a separation between adjacent resistors to inhibit hydraulic cross-talk.

No prior art is known in which the print head structure is designed to diffuse heat away from the heater by specially designed thermal paths or to otherwise solve the thermal cross-talk problem.

SUMMARY OF THE INVENTION

It is therefore the principal object of this invention to provide a thermal drop-on-demand ink jet print head in which thermal cross-talk is eliminated.

In accordance with the invention, the objective is achieved by providing a heat shield means on the surface of the substrate member upon which an array of heating means is produced. The heat shield means extends into the space on the surface between each of the heating means, and each heat shield means is integrally connected to one of the electrical connection members which provides electrical connections to the heating means. The heat shield means conduct heat away from the space between each of the heating means and eliminate thermal cross-talk between adjacent heating means.

In a specific embodiment, the heat shield means comprise thin-film metal fingers integrally attached to the common electrical connection member, the control electrical connection member, or fingers interleaved between some connected to the common electrical connection member and the remaining ones connected to one of the control electrical connection members.

The foregoing and other objects, features and advantages of the invention will be apparent from the following more particular description of a preferred embodiment of the invention as illustrated in the accompanying drawing.

BRIEF DESCRIPTION OF THE DRAWINGS

FIG. 1 is a three dimensional view, with some parts cut away, of a specific embodiment of a thermal drop-on-demand ink jet print head according to the present invention.

FIG. 2 is a section view taken along the lines 2—2 of FIG. 1.

FIG. 6 is a top view of a further embodiment of the electrode structure embodying the invention.

FIG. 7 is a top view of a still further specific embodiment of the electrode structure embodying the invention.

FIG. 8 is a section view taken along lines 8—8 of FIG. 7.

FIG. 9 is a section view taken along lines 9—9 of FIG. 7.

DESCRIPTION OF THE PREFERRED EMBODIMENT

Figure 3:
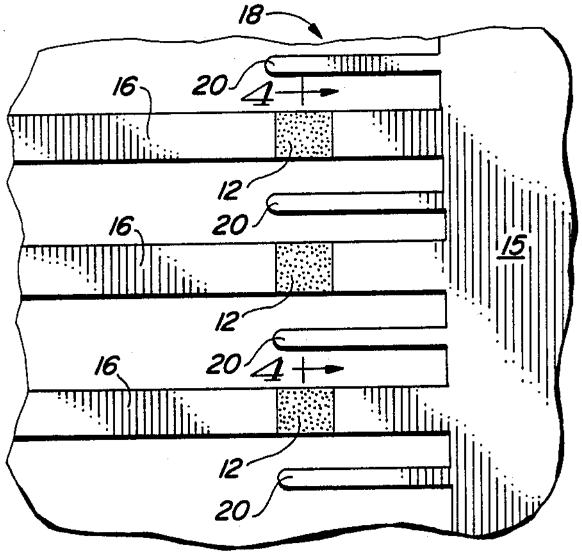
FIG. 3 is a section view taken along the lines 3—3 of FIG. 1.

Referring to FIGS. 1 and 2, the thermal drop-on-demand ink jet print head, according to the present invention, comprises a suitable substrate member 10, upon one surface 11 of which is formed an array of resistive heater elements 12, only one of which is shown in FIG. 1 of the drawings. The resistive heater elements 12 comprise a multilayer thin-flim structure comprising a heat insulation layer 13 and a resistive heater film 14. Layer 13 must also be electrically insulating. A common electrode 15, and an array of control electrodes 16 make electrical contact to each of the resistive heater films 14 and electrically short all areas of the heater films 14 except the area between the electrodes 15 and 16 which forms resistive heater elements 12. A passivation layer is usually deposited over the array of the resistive heater elements 12 and the associated electrodes 15 and 16 to prevent both chemical and mechanical damage to the resistive heater elements 12 and the electrodes 15 and 16. However, the passivation layer is not shown in the drawings so that the underlying structure can be more easily shown. A second substrate member 17 is fixed in position relative to substrate 10 so that wall members 19 define a channel 21 associated with each of the resistive heater elements 12. A nozzle 23 is provided at one end of the channel 21. An ink supply (not shown) is provided to supply a marking fluid such as ink to each of the channels 21.

In operation, a data pulse is supplied to control electrode 16 to energize the associated resistive heater element 12 to produce a bubble 25 in the ink adjacent heater element 12. The inertial effects of a controlled bubble motion to the right as shown by arrow 27 forces a drop 29 of ink from the associated nozzle.

According to the present invention a heat shield means 18 is provided which extends into the space between each of the resistive heater elements 12 to eliminate thermal cross-talk between adjacent resistive heater elements 12. Heat shield means 18 serves as a heat sink so that the lateral heat flow reaching these heat shield means 18 is conducted both along the electrodes and also down to the substrate member 10.

Figure 4:
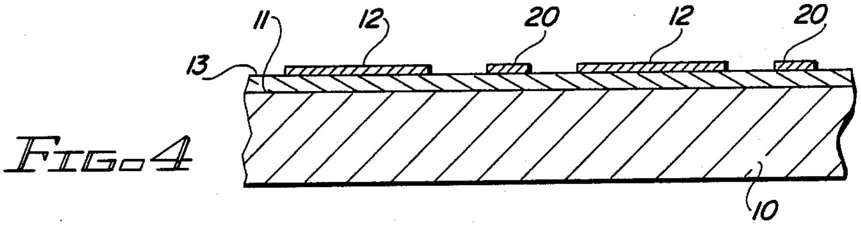
FIG. 4 is a section view taken along the lines 4—4 of FIG. 3.

In the embodiment of the invention shown in FIGS. 3 and 4, heat shield means 18 comprises an array of thin-film metal fingers 20 deposited on the surface of heat insulation layer 13 within the space on layer 13 between each of the resistive heater elements 12. In the embodiment shown, metal fingers 20 are of the same material and integrally connected to the common electrode 15, so that the metal fingers 20 can be produced very easily by a simple change in the mask used in the fabrication of common electrode 15.

Analysis has shown that a major fraction of the heat generated by the resistive heater elements 12 is conducted away by the common electrode 15 and the control electrodes 16. However, until the present invention, there has been no way to conduct away heat from the space between the resistive heater elements 12. By this invention, metal fingers 20 not only conduct away heat from this area directly into the substrate but also conduct heat along the fingers back to the common electrode 15, and in this way eliminate the thermal cross-talk problem.

Figure 5:
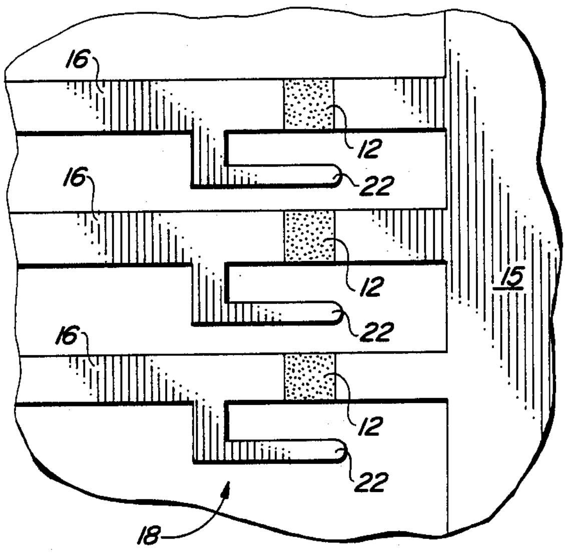
FIG. 5 is a top view of an alternate embodiment of the electrode structure embodying the invention.

In the embodiment of the present invention shown in FIG. 5, thin-film metal fingers 22 are attached to the control electrodes 16 and extend into the area on the surface of layer 13 between adjacent resistive heater elements 12. The operation is similar to the previously described embodiment since heat is conducted to the substrate 10 by fingers 22 and along fingers 22 back to the control electrodes 16.

A further embodiment of the invention is shown in FIG. 6 in which some thin-film metal fingers 24 extend between adjacent resistive heater elements 12 and these fingers are attached to the common electrode 15. Interleaved with these metal fingers 24 are thin-film metal fingers 26 which are attached to the control electrodes 16.

The heat shield means 18 described in this application is operable to significantly decrease the thermal diffusion time constant with the result that the heat is quickly diffused toward the periphery of the heater substrate 10 where heat sink structures (not shown) are available. The resultant effect is that the thermal ink jet head temperature can be controlled at a very low level so that thermal cross-talk is virtually eliminated.

Further thermal cooling can be provided by the embodiment shown in FIGS. 7, 8 and 9. The heat insulation layer 13 acts as a short-term thermal barrier, and this layer comprises a material such as $SiO_2$, for example. As shown in FIG. 8, the heat insulation layer 13 under the thin-film metal fingers 28 is removed by the use of an additional processing step using standard techniques such as reactive ion etching, for example. In this way the metal fingers 28 are deposited directly on the surface 11 of substrate member 10 which has a much higher thermal conductivity than heat insulation layer 13. In some cases in which substrate member 10 is electrically conductive, it may not be possible to completely remove the part of the heat insulation layer 13 under the thin film metal fingers 28. However, in this case, further cooling can be provided by substantially thinning the part of heat insulation layer 13 under the metal fingers 28. In addition, further thermal cooling can be accomplished by reducing the thickness of the heat insulation layer 13 in those areas under both the common electrode 15 the control electrodes 16 as shown in FIG. 9.

It is also possible to provide additional cooling by eliminating the heat insulation layer 13 entirely under the common electrode 15 area so that heat flow into the substrate member 10 is maximized. The heat insulation layer 13 can be eliminated entirely under the common electrode 15 when the substrate member 10 is not electrically conductive. The layer 13 can also be eliminated under the common electrode 15 when the common electrode is maintained at ground potential without regard to whether or not the subtrate member 10 is electrically conductive.

A simple change in heater substrate structure with the addition of metal cooling fingers, control electrodes metallurgy separated from the electrically and thermally conductive substrate member by a much thinner heat insulation layer, and common electrode are as directly in contact with the thermally conductive substrate member provide improved thermal cooling and minimize thermal cross-talk among adjacent channels.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new, and desire to secure by Letters Patent is:

1. A thermal drop-on-demand ink jet print head suitable for high resolution, high density printing comprising:

a thermally conductive substrate member;

a plurality of closely spaced heating means on a surface of said substrate member;

a first electrical connection member on said surface of said substrate member, said first electrical connection member being in contact with all of said heating means;

an array of second electrical connection members on said surface of said substrate member, each of said second electrical connection members extending in a direction generally away from said first electrical connection member and being in electrical contact with only one of said heating means;

a heat shield means on said surface extending into the space between each of said heating means, each of said heat shield means comprising a structure in addition to said electrical connection members integrally connected to one of said electrical connection members to conduct heat away from the space between each of said heating means, in addition to the heat conducted away from said heating means by said electrical connection members, to eliminate thermal cross-talk between adjacent heating means so that high resolution, high density printing can be produced.

2. The thermal drop-on-demand ink jet print head of claim 1 wherein said heat shield means are connected to said first electrical connection member.

3. The thermal drop-on-demand ink jet print head of claim 1 wherein said heat shield means are each connected to one of said array of second electrical connection members.

4. The thermal drop-on-demand ink jet print head of claim 1 wherein said heat shield means are interleaved with some of said heat shield means connected to said first electrical connection member, and the remaining ones of said heat shield means each being connected to one of said array of second electrical connection members.

5. A thermal drop-on-demand ink jet print head suitable for high resolution, high density printing comprising:

a thermally conductive substrate member;

a heat insulation layer deposited on a surface of said substrate member;

a plurality of closely spaced heating means on said heat insulation layer;

a first electrical connection member on said heat insulation layer, said first electrical connection member being in contact with all of said heating means;

an array of second electrical connection members on said heat insulation layer, each of said second electrical connection members extending in a direction generally away from said first electrical connection member and being in electrical contact with only one of said heating means;

a heat shield means on said heat insulation layer extending into the space between each of said heating means, each of said heat shield means comprising a structure in addition to said electrical connection members integrally connected to one of said electrical connection members to conduct heat away from the space between each of said heating means, in addition to the heat conducted away from said heating means by said electrical connection members, to eliminate thermal cross-talk between adjacent heating means so that high resolution, high density printing can be produced.

6. The thermal drop-on-demand ink jet print head of claim 5 wherein said heat shield means are connected to said first electrical connection member.

7. The thermal drop-on-demand ink jet print head of claim 5 wherein said heat shield means are each connected to one of said array of second electrical connection members.

8. The thermal drop-on-demand ink jet print head of claim 5 wherein said heat shield means are interleaved with some of said heat shield means connected to said first electrical connection member, and the remaining ones of said heat shield means each being connected to one of said array of second electrical connection members.

9. The thermal drop-on-demand ink jet print head of claim 5 wherein said heat insulation layer is removed under said heat shield means whereby said heat shield means are in direct thermal contact with said surface of said substrate member.

10. The thermal drop-on-demand ink jet print head of claim 9 wherein said heat shield means are connected to said first electrical connection member.

11. The thermal drop-on-demand ink jet print head of claim 9 wherein said heat shield means are each connected to one of said array of second electrical connection members.

12. The thermal drop-on-demand ink jet print head of claim 9 wherein said heat shield means are interleaved with some of said heat shield means connected to said first electrical connection member, and the remaining ones of said heat shield means each being connected to one of said array of second electrical connection members.

13. The thermal drop-on-demand ink jet print head of claim 5 wherein said heat insulation layer has a predetermined thickness, and wherein the thickness of said heat insulation layer under said array of electrical connection members is less than said predetermined thickness whereby said array of electrical connection members increase the effective thermal diffusivity to said substrate member.

14. The thermal drop-on-demand ink jet print head of claim 13 wherein said heat shield means are connected to said first electrical connection member.

15. The thermal drop-on-demand ink jet print head of claim 13 wherein said heat shield means are each connected to one of said array of second electrical connection members.

16. The thermal drop-on-demand ink jet print head of claim 13 wherein said heat shield means are interleaved with some of said heat shield means connected to said first electrical connection member, and the remaining ones of said heat shield means each being connected to one of said array of second electrical connection members.

17. The thermal drop-on-demand ink jet print head of claim 5 wherein said heat insulation layer has a predetermined thickness, and wherein the thickness of said heat insulation layer under said heat shield means is less than said predetermined thickness whereby said heat shield means increase the effective thermal diffusivity to said substrate member.

18. The thermal drop-on-demand ink jet print head of claim 17 wherein said heat shield means are connected to said first electrical connection member.

19. The thermal drop-on-demand ink jet print head of claim 17 wherein said heat shield means are each connected to one of said array of second electrical connection members.

20. The thermal drop-on-demand ink jet print head of claim 17 wherein said heat shield means are interleaved with some of said heat shield means connected to said first electrical connection member, and the remaining ones of said heat shield means each being connected to one of said array of second electrical connection members.

* * * * *